United States Patent
Kuzawa et al.

(10) Patent No.: US 7,220,788 B2
(45) Date of Patent: May 22, 2007

(54) FLUORORUBBER MOLDED ARTICLE AND METHOD FOR PRODUCING THE SAME

(75) Inventors: Naoya Kuzawa, Shizuoka (JP); Mitsuyuki Nakano, Shizuoka (JP); Hitoshi Ogura, Shizuoka (JP); Masayuki Saito, Chiba (JP)

(73) Assignee: Nichias Corporation, Tokyo (JP)

( * ) Notice: Subject to any disclaimer, the term of this patent is extended or adjusted under 35 U.S.C. 154(b) by 363 days.

(21) Appl. No.: 10/787,743

(22) Filed: Feb. 27, 2004

(65) Prior Publication Data

US 2004/0171714 A1 Sep. 2, 2004

(30) Foreign Application Priority Data

Feb. 28, 2003 (JP) .......................... P.2003-053494

(51) Int. Cl.
*C08F 2/00* (2006.01)
*C08F 2/46* (2006.01)

(52) U.S. Cl. ...................... 522/186; 522/184; 522/185; 522/187; 522/189; 522/174; 522/150; 522/152; 522/155; 522/156; 522/113; 522/114; 522/116; 522/132; 264/494; 264/496

(58) Field of Classification Search ................ 522/184, 522/189, 174, 113, 114, 116, 133, 132, 150, 522/152, 155, 156, 185, 186, 187; 264/494, 264/496
See application file for complete search history.

(56) References Cited

U.S. PATENT DOCUMENTS

| | | | | | |
|---|---|---|---|---|---|
| 4,960,624 | A | * | 10/1990 | Ueno | ......................... 428/35.1 |
| 5,275,887 | A | * | 1/1994 | Johnson et al. | ............. 428/422 |
| 5,700,866 | A | * | 12/1997 | Tabb | ........................... 524/520 |
| 6,107,363 | A | * | 8/2000 | Gayer et al. | ................ 522/116 |
| 2005/0075461 | A1 | * | 4/2005 | Morimoto et al. | ....... 525/326.3 |

FOREIGN PATENT DOCUMENTS

| | | |
|---|---|---|
| EP | 0 203 457 A1 | 12/1986 |
| EP | 1 231 239 A1 | 8/2002 |
| JP | 07179705 | 7/1995 |
| JP | 08012767 | 1/1996 |
| JP | 09031285 | 2/1997 |
| JP | 2000-119468 A | 4/2000 |
| WO | WO 03/029306 A1 | 4/2003 |

* cited by examiner

*Primary Examiner*—Sanza L. McClendon
(74) *Attorney, Agent, or Firm*—Nixon & Vanderhye P.C.

(57) ABSTRACT

The present invention relates to a fluororubber molded article obtained by subjecting a fluororubber composition to crosslinking by irradiation of ionizing radiation, wherein the fluororubber composition comprises: (i) a raw rubber having a metal element content of 1.5% or less and comprising a tetrafluoroethylene-propylene copolymer; and (ii) a prepolymer of triallyl isocyanurate. Also disclosed is a method for producing the fluororubber molded article.

5 Claims, No Drawings

FLUORORUBBER MOLDED ARTICLE AND METHOD FOR PRODUCING THE SAME

FIELD OF THE INVENTION

The present invention relates to a molded article comprising a fluororubber, and more particularly to a fluororubber molded article suitable as a rubber material used in a site requiring purity, low metal elution, low gas release, plasma resistance, ozone resistance, chemical resistance, heat resistance, etc., particularly suitable as a rubber material used in semiconductor production equipment or semiconductor conveyance equipment. In addition, the invention further relates to a production method for obtaining the fluororubber molded article.

BACKGROUND OF THE INVENTION

Semiconductor production equipment or semiconductor conveyance equipment is used under circumstances such as a plasma atmosphere, a chemical atmosphere and an ozone atmosphere, so that a rubber material used in such equipment requires plasma resistance, chemical resistance and ozone resistance, as well as purity that constituent components are not eluted from the material.

To such requirements, a fluororubber molded article is frequently used as the rubber material (for example, see patent document 1 specified below). However, the fluororubber molded article requires the use of a crosslinking agent for securing mechanical strength, so that there is the possibility that an unreacted moiety of the crosslinking agent and crosslinking degradation products are eluted. This raises a problem with regard to purity.

Of the fluororubbers, a tetrafluoroethylene-propylene copolymer is crosslinked by irradiation of ionizing radiation without using the crosslinking agent, thereby also sufficiently securing mechanical strength. Accordingly, there is no problem with regard to purity derived from the crosslinking agent. However, not only the tetrafluoroethylene-propylene copolymer but also a solid rubber generally contains metal elements derived from a polymerization catalyst, an emulsifier and a metal salt used in coagulating a raw latex. Accordingly, when such a rubber material is used as a sealing material, for example, in semiconductor production equipment utilizing plasma gas or ozone gas, there is a fear that the rubber material is decomposed to vaporize, so that the metal elements contained therein emerge in the form of particles to contaminate a semiconductor.

Further, sealing materials are ordinarily used in a state where tensile stress or compression stress is applied. When the sealing material comprising the fluororubber molded article is exposed to the plasma gas or the ozone gas under such stress, it is cracked within a short time to cause a leak.

Patent Document 1: JP 2000-119468 A

SUMMARY OF THE INVENTION

The invention has been made in view of the foregoing situation.

Therefore, an object of the invention is to provide a fluororubber molded article excellent in purity, low metal elution, low gas release, plasma resistance, ozone resistance, chemical resistance, heat resistance, etc., also having sufficient mechanical strength, and particularly suitable as a rubber material used in semiconductor production equipment or semiconductor conveyance equipment.

Another object of the invention is to provide a method for producing the fluororubber molded article.

Other objects and effects of the invention will become apparent from the following description.

In order to achieve the above-mentioned object, the present inventers conducted extensive investigation. As a result, the inventers found that crosslinking proceeds efficiently by using a tetrafluoroethylene-propylene copolymer whose metal content is controlled low, and further allowing a prepolymer of triallyl isocyanurate to exist when crosslinking the copolymer by irradiation of ionizing radiation.

Specifically, the above-described objects of the invention has been achieved by providing a fluororubber molded article obtained by subjecting a fluororubber composition to crosslinking by irradiation of ionizing radiation, wherein the fluororubber composition comprises:

(i) a raw rubber having a metal element content of 1.5% or less and comprising a tetrafluoroethylene-propylene copolymer; and (ii) a prepolymer of triallyl isocyanurate.

In a preferred embodiment, the fluororubber composition contains the triallyl isocyanurate prepolymer in an amount of 5 to 50 parts by weight per 100 parts by weight of the raw rubber.

In an another preferred embodiment, the molded article is further subjected to heat treatment at a temperature of 50 to 300° C. for 0.1 to 10 hours.

The present invention also relates to a rubber material for semiconductor production equipment, which comprises the above-described fluororubber molded article.

Further, the present invention also relates to a method for producing a fluororubber molded article, which comprises the steps of:

(A) providing a fluororubber composition comprising:
  (i) a raw rubber having a metal element content of 1.5% or less and comprising a tetrafluoroethylene-propylene copolymer; and
  (ii) a prepolymer of triallyl isocyanurate;

(B) preforming the fluororubber composition into a predetermined form in a heated atmosphere; and (C) subjecting the preformed product to crosslinking by irradiation of ionizing radiation.

In a preferred embodiment, the method further comprises heating the crosslinked product at a temperature of 50 to 300° C. for 0.1 to 10 hours.

DETAILED DESCRIPTION OF THE INVENTION

The invention will be described in detail below.

The raw rubber for use in the invention is a rubber having a reduced metal element content of 1.5% or less and comprising a tetrafluoroethylene-propylene copolymer. Although the composition of this tetrafluoroethylene-propylene copolymer is not limited, the molar ratio of tetrafluoroethylene to propylene is preferably from 40:60 to 60:40, and more preferably from 50:50 to 60:40.

As described above, solid rubbers generally contain metal elements derived from metal salts etc. contained in materials used in respective stages from polymerization to purification. The content thereof is usually from one to several percent by weight. However, in the semiconductor production equipment mainly intended in the invention, the metal elements emerge in the form of particles to largely impair purity. Further, when particles of metal salts such as metal oxides are dispersed in the fluororubber molded article, application of tensile stress or compression stress to the molded article particularly used as the sealing material causes stress concentration in interfaces between the rubber and the metal salt particles. When the plasma gas or the ozone gas acts thereon, the rubber is preferentially decomposed at the stress-concentrated portion, resulting in easy development of cracks. Then, in the present invention, the metal content of the tetrafluoroethylene-propylene copolymer is reduced to 1.5% by weight or less, preferably to 1% by weight or less.

The tetrafluoroethylene-propylene copolymer is produced as a latex thereof by emulsion polymerization, suspension polymerization or solution polymerization. In order to adjust the metal content to 1.5% by weight or less, the tetrafluoroethylene-propylene copolymer latex may be coagulated with a coagulating agent other than a metal salt. Such coagulating agents include an organic solvent, an unsaturated carboxylic acid, an inorganic acid, an ammonium salt, a nonionic surfactant an alcohol and a polymer coagulating agent. Further, even when a metal salt such as sodium chloride, potassium chloride, aluminum chloride or aluminum sulfate is used, the metal element content can be reduced to 1.5% by weight or less by sufficient water washing. Furthermore, the metal content can also be reduced to 1.5% by weight or less by dropping of a solution of the solid rubber dissolved in a good solvent to a large amount of a poor solvent to precipitate the solid rubber.

Further, in a commercially available tetrafluoroethylene-propylene copolymer, a double bond is formed by heat treatment in order to introduce a crosslinking site into a rubber molecule, on the assumption that crosslinking is to be carried out with a crosslinking agent. The rubber shows a brown color by this heat treatment. However, from the viewpoint of appearance, the rubber is preferably transparent as a commercial product in some cases. Consequently, in the invention, a tetrafluoroethylene-propylene copolymer having subjected to no introduction of crosslinking sites by heat treatment is preferably used.

In the invention, a prepolymer of triallyl isocyanurate is added to the above-mentioned raw rubber to form a fluororubber composition. The presence of the prepolymer of triallyl isocyanurate allows crosslinking by ionizing radiation described below to efficiently proceed. From this fact, it is deduced that the prepolymer of triallyl isocyanurate acts as a co-crosslinking agent. As the prepolymer of triallyl isocyanurate, though those well known in the art can be used, those having a number-average molecular weight of about 5,000 to 60,000 are preferably used. The reason for this is that when the molecular weight is too low, the prepolymer goes into a liquid state, which may make it difficult to prepare a homogeneous fluororubber composition and a preformed product. As such a prepolymer of triallyl isocyanurate, for example, "TAIC Prepolymer" manufactured by Nippon Kasei Chemical Co., ltd. is available from the market.

The prepolymer of triallyl isocyanurate is added in an amount of 5 to 50 parts by weight, preferably in an amount of 10 to 30 parts by weight, per 100 parts by weight of the raw rubber. When the amount added is less than 5 parts by weight, the effect of enhancing crosslinking by ionizing radiation may sometime become insufficient. On the other hand, the amount exceeding 50 parts by weight may sometime result in the disappearance of rubber elasticity of the fluororubber molded article.

The above-mentioned fluororubber composition is formed into a preformed product having a predetermined form without adding other additives (a crosslinking agent, a filler, etc.), and crosslinked by irradiation of ionizing radiation to form a fluororubber molded article of the invention.

The preformed product can be obtained by press molding the fluororubber composition in a mold heated preferably to a temperature of 100 to 200° C., more preferably to a temperature of 140 to 180° C. (generally, under a pressure of 20 to 70 MPa per unit area of the product and for a retention time of 5 to 20 min.); cooling the mold to a temperature of 80° C. or less; and then, releasing the preformed product from the mold. The preforming can also be effected by a conventional process such as extrusion molding, injection molding, blow molding or transfer molding.

As for the kind of ionizing radiation, a γ-ray, an electron beam, an X-ray, a proton beam, a deuteron beam, an α-ray, a β-ray, etc. can be used either singly or in combination. Of these, the γ-ray and the electron beam are preferred because of their easy use. The use of the γ-ray makes it possible to conduct sterilization treatment, as well as crosslinking, and is suitable particularly in the food field.

As for the dose of ionizing radiation, the amount of energy sufficient to permeate throughout the preformed product in the thickness direction thereof is necessary. Lack of the dose results in insufficient crosslinking to fail to impart sufficient physical properties such as mechanical strength and compression set to the fluororubber molded article. On the other hand, when the dose becomes too much, the disintegration reaction of fluororubber molecules proceeds to lower the molecular weight, thereby deteriorating physical properties such as mechanical strength. In the invention, when the dose of ionizing radiation is from 10 to 500 kGy in terms of the total dose, almost sufficient crosslinking can be performed.

As the atmosphere in applying ionizing radiation, any atmosphere such as a vacuum atmosphere, an atmospheric atmosphere or an inert gas atmosphere is available. In the case of the γ-ray, the preformed product is irradiated therewith particularly preferably in an atmosphere in which oxygen is removed as much as possible, such as in the vacuum or in the inert gas. The presence of oxygen in the irradiation atmosphere inhibits the crosslinking reaction. As a result, there is a fear that the mechanical strength of the fluororubber molded article may become insufficient, or that the surface of the molded article may be sticky. In the case of the electron beam, there is no problem even when the preformed product is irradiated therewith in the air.

Although the fluororubber molded article of the invention is obtained as described above, it is preferred that the fluororubber molded article is further heat treated at a temperature of 50 to 300° C. for 0.1 to 10 hours. There is no particular limitation on the heating method, and the molded article can be treated in any medium of hot water, steam, oil, etc., as well as in an electric furnace of an oxygen atmosphere, a reduced-pressure atmosphere or a reduction atmosphere. Such heat treatment removes volatile components on the surface of the molded article to more enhance purity, and also improves mechanical strength.

The fluororubber molded article of the invention is excellent in mechanical characteristics such as heat resistance, mechanical strength and compression set, and also excellent in plasma resistance, as well as in purity and chemical resistance. Accordingly, it is suitable for the field of semiconductor production, the medical field and the food field. For example, in the field of semiconductor production, it can be used in semiconductor production equipment such as wet washing equipment, plasma etching equipment, plasma ashing equipment, plasma CVD equipment, ion implantation equipment or sputtering equipment, and in ancillary equipment thereof such as wafer conveyance equipment.

When mechanical characteristics are put above purity in the above-mentioned uses, it is also possible to use a crosslinking agent, filler, etc. within such a range that the metal content does not exceed 1.5% by weight. Further, another fluororubber may also be incorporated into the raw rubber within such a range that the effect of the invention is not impaired. There can be incorporated, for example, a vinylidene fluoride-hexafluoropropylene copolymer, a vinylidene fluoride-hexafluoropropylene-tetrafluoroethylene copolymer, a vinylidene fluoride-hexafluoropropylene-perfluoromethyl vinyl ether terpolymer or an ethylene-tetrafluoroethylene-perfluoromethyl vinyl ether terpolymer.

EXAMPLES

The present invention will be illustrated in greater detail with reference to the following examples and comparative examples, but the invention should not be construed as being limited thereto.

Examples 1 to 4 and Comparative Examples 1 and 2

Respective materials were mixed according to the formulation shown in Table 1, and kneaded by an open roll for 10 minutes. The resulting fluororubber composition was set in a mold, which was then preheated with a hot press until the mold temperature reached 170° C., followed by maintaining it for about 1 minute under pressure. Then, the mold was taken out of the hot press, and cooled until the mold temperature was lowered to 50° C. or less, followed by mold release to obtain a preformed product. Then, the preformed product was irradiated with a γ-ray of 120 kGy in a nitrogen atmosphere to obtain a test piece. Further, in Example 4, the resulting test piece was further heat treated in an atmosphere of oxygen in an electric furnace at 200° C. for 2 hours.

The fluororubber, co-crosslinking agent (1) and co-crosslinking agent (2) used in Examples and Comparative Examples are each as follows:

Co-Crosslinking Agent (2):

"TAIC" (triallyl isocyanurate) manufactured by Nippon Kasei Chemical Co., ltd.

For the respective test pieces thus obtained, the following evaluations were made. The results thereof are shown together in Table 1.

Tensile Strength:
Measured in accordance with JIS K 6251.

Hardness:
Measured in accordance with JIS K 6253.

Compression Set:
Measured at 200° C. for 70 hours in accordance with JIS K 6262.

Plasma Resistance:
Evaluated by plasma irradiation under the following conditions:
Type of plasma gas: Oxygen
Amount of gas: 20 SCCM
Frequency of RF: 13.56 MHz
High frequency output: 150 W
Evaluation method: A decrease in weight per unit area was measured. The case where the particles were developed in large amounts and a decrease in weight was large is indicated as "poor", the case where a decrease in weight was somewhat large is indicated as "fair", and the case where the particles were scarcely developed and a decrease in weight was scarcely observed is indicated as "good".

Further, kneadability in preparing the fluororubber composition was also evaluated. That is to say, the dispersed state of the fluororubber composition after kneading was visually observed. When the dispersed state was good, it is indicated as "good", and when the dispersed state was poor, it is indicated as "poor". The results thereof are shown together in Table 1.

TABLE 1

|  | Example 1 | Example 2 | Example 3 | Example 4 | Comparative Example 1 | Comparative Example 2 |
| --- | --- | --- | --- | --- | --- | --- |
| Fluororubber | 100 | 100 | 100 | 100 | 100 | 100 |
| Co-Crosslinking Agent (1) | 5 | 20 | 50 | 20 | — | — |
| Co-Crosslinking Agent (2) | — | — | — | — | — | 5 |
| γ-Ray Irradiation (kGy) | 120 | 120 | 120 | 120 | 120 | 120 |
| Heat Treatment | — | — | — | At 200° C. for 2 hours | — | — |
| Kneadability | Good | Good | Good | Good | Good | Poor |
| Tensile Strength (MPa) | 15 | 19 | 27 | 20 | 8 | — |
| Breaking Elongation (%) | 310 | 250 | 120 | 255 | 400 | — |
| Hardness (duroA) | 58 | 75 | 90 | 74 | 55 | — |
| Compression Set (%) | 28 | 22 | 20 | 23 | 30 | — |
| Plasma Resistance | Good | Good | Good | Good | Good | — |

Fluororubber:
A tetrafluoroethylene-propylene copolymer (a fluororubber obtained by purifying "Aflas 150C" manufactured by Asahi Glass Co., Ltd. through coagulation with a coagulating agent other than a metal salt to reduce its metal content to 1% by weight or less)

Co-Crosslinking Agent (1):
"TAIC Prepolymer" (triallyl isocyanurate prepolymer) manufactured by Nippon Kasei Chemical Co., ltd.

As shown in Table 1, the test pieces of Examples according to the invention are greatly improved in tensile strength, hardness and compression set, compared to the test piece of Comparative Example 1. Further, in Comparative Example 2, dispersibility in kneading was very poor, so that a molded article could not be formed.

As described above, according to the invention, there is obtained the fluororubber molded article excellent in plasma resistance, ozone resistance, chemical resistance, heat resistance, etc., as well as in purity, also having sufficient mechanical strength, and particularly suitable as a rubber material used in the semiconductor field.

While the present invention has been described in detail and with reference to specific embodiments thereof, it will be apparent to one skilled in the art that various changes and modifications can be made therein without departing from the spirit and scope thereof.

The present application is based on Japanese patent application No. 2003-53494 filed Feb. 28, 2003, the content thereof being herein incorporated by reference.

What is claimed is:

1. A fluororubber molded article obtained by subjecting a fluororubber composition to crosslinking by irradiation of ionizing radiation,
   wherein said fluororubber composition comprises:
   (i) a raw rubber having a metal element content of 1.5% or less and comprising a tetrafluoroethylene-propylene copolymer; and
   (ii) a prepolymer of triallyl isocyanurate.

2. The fluororubber molded article according to claim 1, wherein said fluororubber composition contains said triallyl isocyanurate prepolymer in an amount of 5 to 50 parts by weight per 100 parts by weight of the raw rubber.

3. The fluororubber molded article according to claim 1, wherein the molded article is further subjected to heat treatment at a temperature of 50 to 300° C. for 0.1 to 10 hours.

4. A method for producing a fluororubber molded article, which comprises the steps of:
   (A) providing a fluororubber composition comprising:
      (i) a raw rubber having a metal element content of 1.5% or less and comprising a tetrafluoroethylene-propylene copolymer; and
      (ii) a prepolymer of triallyl isocyanurate;
   (B) preforming said fluororubber composition into a predetermined form in a heated atmosphere; and
   (C) subjecting said preformed product to crosslinking by irradiation of ionizing radiation.

5. The method according to claim 4, further comprising heating said crosslinked product at a temperature of 50 to 300° C. for 0.1 to 10 hours.

* * * * *